UNITED STATES PATENT OFFICE.

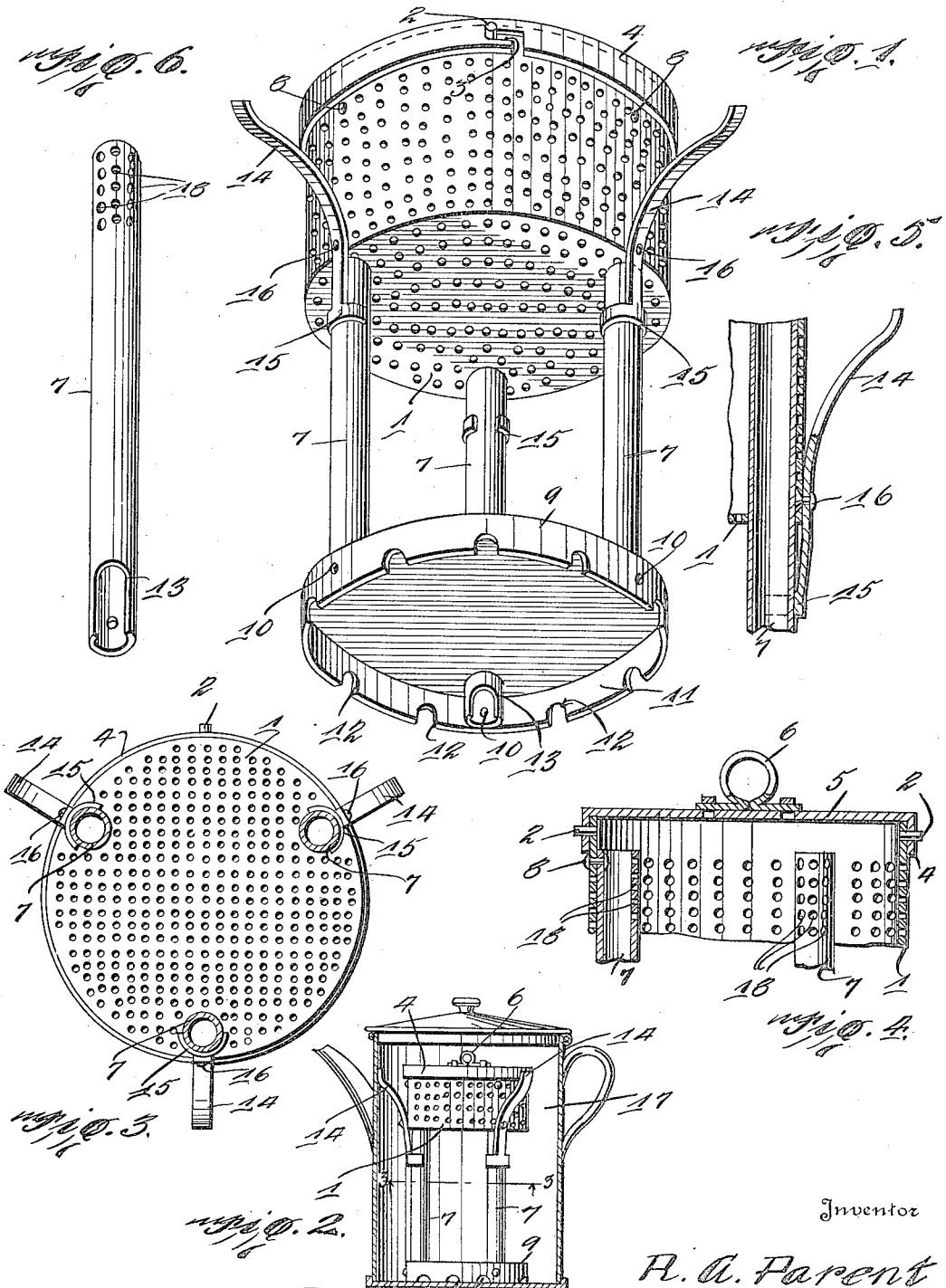

RUFUS A. PARENT, OF SOUTH TACOMA, WASHINGTON.

COFFEE-PERCOLATOR.

1,231,641.  Specification of Letters Patent.  Patented July 3, 1917.

Application filed May 29, 1916. Serial No. 100,615.

*To all whom it may concern:*

Be it known that I, RUFUS A. PARENT, a citizen of the United States of America, residing at South Tacoma, in the county of Pierce and State of Washington, have invented certain new and useful Improvements in Coffee-Percolators, of which the following is a specification, reference being had therein to the accompanying drawing.

This invention relates to coffee percolators and has for its object the production of a simple and efficient means for making coffee and preventing the grounds from mixing with the liquid within the container pot.

Another object of this invention is the production of a simple and efficient construction whereby the percolator may be applied to any receptacle or coffee pot without the necessity of employing some particular construction of a receptacle or pot.

Other objects and advantages of the present invention will appear throughout the following specification and claims.

In the accompanying drawing:

Figure 1 is a perspective view of the percolator detached from the receptacle.

Fig. 2 is a vertical section through a coffee pot showing a percolator positioned therein, the percolator being shown in side elevation.

Fig. 3 is a transverse sectional view taken on line 3—3, of Fig. 2, looking in the direction of the arrow.

Fig. 4 is a vertical sectional view through the upper end of the percolator.

Fig. 5 is a vertical sectional view through one side of the percolator showing the manner of passing the tubes through the upper portion of the percolator.

Fig. 6 is a detail perspective of one of the tubes used in connection with the present invention.

By referring to the drawings it will be seen that 1 designates the coffee containing receptacle of the percolator which preferably consists in a substantial cylindrical body having a perforated bottom and side walls as clearly illustrated in Fig. 1 of the drawings. The coffee containing receptacle 1 is provided with laterally extending pins 2 near the top thereof, which pins 2 fit in the bayonet slots 3 formed in the flange 4 of the removable cover 5. This cover 5 is adapted to fit upon the coffee containing receptacle 1 as illustrated clearly in Fig. 4 of the drawing. A suitable handle or finger grip 6 is carried by the top 5 and may be secured thereto in any suitable or desired manner.

A plurality of vertically extending tubes 7 are carried by the coffee containing receptacle 1 and pass through the bottom thereof and are securely fastened to the sides of the receptacle 1 by means of the rivets 8 as illustrated in Fig. 1 of the drawing. These tubes 7 pass through and are secured to a base 9 by means of the rivets 10, which pass through the supporting flange 11 of the base 9. This supporting flange 11 is provided with a plurality of notches 12 formed along the lower periphery of the flange 11 as clearly illustrated in Fig. 1 of the drawing. The lower end of each tube 7 is also provided with a notch 13 upon one side thereof for the purpose of permitting the entrance of liquid into the tubes 7 to cause the liquid to rise in the tubes and be discharged into the coffee containing receptacle 1 supported by the upper ends of the tubes 7.

A spring clip or finger 14 is secured to each tube 7 near the upper end thereof, and each finger or clip comprises a plurality of laterally extending jaws 15 upon the lower ends thereof, which jaws straddle or extend around the tubes 7 for holding the fingers or clips 14 in proper vertical alinement. Rivets 16 also pass through the fingers 14 for the purpose of securing the same to the sides of the receptacle 1. These fingers 14 extend or are bowed outwardly as clearly illustrated in Figs. 1 and 2 of the drawings, and since these fingers 14 are formed of spring metal it will be seen that the same will firmly grip the inner face of the receptacle, such as the coffee pot indicated by the numeral 17, and hold the percolator within the container against rattling and substantially within the center of the receptacle.

The operation of the device is as follows:

A suitable quantity of water is placed within the container 17, and a suitable amount or portion of coffee is placed within the receptacle 1. As the water within the container 17 comes to a boiling point, this water will rise in the tubes 7 and be discharged out through the perforations 18 formed in the top of the tubes 7. The hot water will then drain through the coffee mounted within the receptacle 1, and owing to the fact that this receptacle 1 is perforated upon the bottom and sides thereof, a thorough mixture will be obtained through the coffee and the water placed within the container 17. As this process continues the coffee will become thoroughly percolated and will be free from coffee grounds.

Having thus described the invention what is claimed as new, is:—

1. A percolator of the class described comprising a base, said base provided with a depending flange around the periphery thereof, said flange provided with a plurality of notches along the lower edge thereof, a containing receptacle, a plurality of tubes supporting said containing receptacle, each tube provided with a notch upon the lower edge thereof for facilitating the entrance of liquid into said tubes, each tube also provided with a perforated upper end, said container comprising a perforated body, and a spring finger secured to each tube and provided with an outwardly bowed end for facilitating the gripping of the sides of a container for holding said percolator in a substantial central position therein.

2. A percolator of the class described comprising a base, said base provided with a depending flange around the periphery thereof, said flange provided with a plurality of notches along the lower edge thereof, a containing receptacle, a plurality of tubes supporting said containing receptacle, each tube provided with a notch upon the lower edge thereof for facilitating the entrance of liquid into said tubes, each tube also provided with a perforated upper end, said container comprising a perforated body, a spring finger secured to each tube and provided with an outwardly bowed end for facilitating the gripping of the sides of a container for holding said percolator in a substantial central position therein, and said spring fingers provided with laterally projecting jaws straddling said tubes and holding said spring fingers in proper vertical alinement.

3. A percolator of the class described comprising a base, said base provided with a depending flange around the periphery thereof, a containing receptacle, a plurality of tubes supporting said containing receptacle, each tube provided with means upon the lower end thereof for facilitating the entrance of liquid into said tubes, each tube also being provided with a perforated upper end extending into said containing receptacle, said container comprising a perforated body, said flange of said base provided with means for permitting the passage of liquid to said base, and spring members secured to said tubes and being outwardly bowed for holding said percolator in a substantially central position upon a support.

In testimony whereof I hereunto affix my signature.

RUFUS A. PARENT.

Copies of this patent may be obtained for five cents each, by addressing the "Commissioner of Patents, Washington, D. C."